May 31, 1955 M. S. ROUSH 2,709,569
IMPELLER MEMBER AND METHOD OF MAKING SAME
Filed Aug. 28, 1948
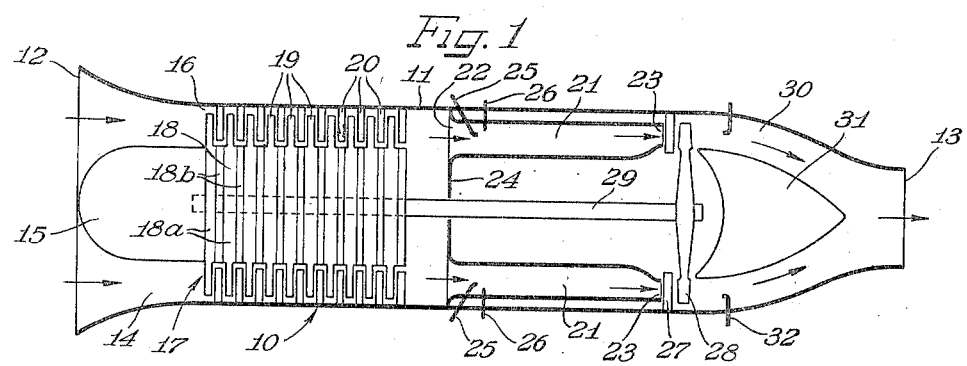
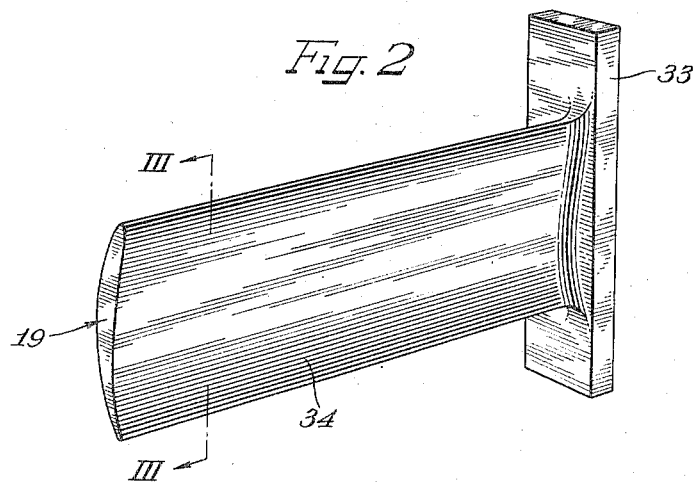
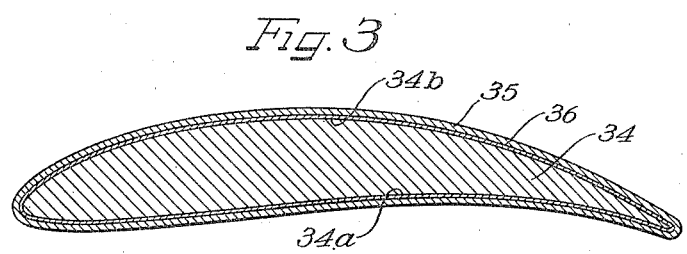
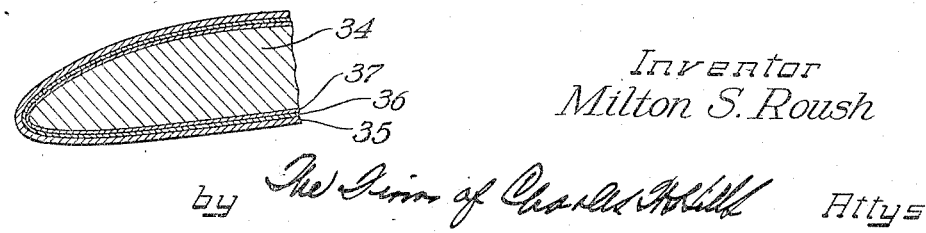
Inventor
Milton S. Roush
by *The Firm of Charles H. Wills* Attys

2,709,569

IMPELLER MEMBER AND METHOD OF MAKING SAME

Milton S. Roush, Painesville, Ohio, assignor to Thompson Products, Inc., Cleveland, Ohio, a corporation of Ohio Application August 28, 1948, Serial No. 46,670

10 Claims. (Cl. 253—77)

The present invention relates to the coating of reactive metals with protective organosiloxane films and more particularly deals with the production of accurate, stable relatively non-wettable surfaces on fluid flow directing metal members of turbine engines wherein the metal of the directing member is reacted with an organosiloxane polymer.

The organosiloxane polymers, commonly known as the "silicones," are long chain or cyclic organosilicon compositions in which organic groups are connected by carbon-silicon bonds to the silicon atoms of a silicon-oxygen network. The high molecular weight organosiloxane polymers are conventionally prepared by the hydrolysis and subsequent condensation of the corresponding organosilicon halides or esters. The preparation of organosilicon halides and the hydrolysis and condensation of the halides to form the organosiloxanes may, for example, be carried out in the manner described in United States Patent No. 2,258,218 to Eugene G. Rochow.

Resins for coating metallic and other surfaces may be prepared by the co-hydrolysis and co-condensation in a suitable hydrocarbon solvent of a mixture of organosilicon halides containing differing organic constituents. For example, a suitable coating resin may contain dimethylsiloxane units, monomethylsiloxane units, and phenylmethylsiloxane units. The specific physical and chemical properties of the resin are dependent upon the proportions of ingredients and the degree of condensation of the copolymer.

I have now found that coatings obtained upon the application of organosiloxane resin, such as those above-described, to certain reactive metal surfaces may be vastly improved with the production of a more closely adherent coating possessing enhanced smoothness, resistance to abrasion and vibration, and resistance to corrosion at relatively high temperatures.

The coating of the present invention is particularly useful in the manufacture of precision contours on the fluid flow directing surfaces of turbine engines. Such surfaces, and particularly the air directing fins or blades of the engine, are subjected to tremendous strains and stresses, and yet, to be efficient, the surfaces must be relatively thin and light in weight. They must resist extreme corrosive and erosive conditions encountered under actual operating conditions. Further, smooth working faces must be continually presented to efficiently direct the working fluid through the turbine. Since ice formation on the working faces would soon destroy their efficiency, these surfaces should be non-wettable with water vapor-laden air or ice-forming fluids such as water.

According to the present invention, an organosiloxane polymer is reacted with the surface of a reactive metal, or an alloy of a reactive metal, to chemically combine the metal and coating. I have found that suitable coatings may be obtained by applying the siloxane in liquid form, as in solution in a hydrocarbon solvent, to receptive surfaces composed of reactive metals such as magnesium, cadmium, molybdenum, tungsten, chromium, nickel, aluminum, lead, tin or zinc, or to alloys containing at least one of the hereinbefore recited active metals. The oxide of each of these metals adheres very closely to the surface of the metal itself and the oxide is believed to bind the siloxane polymers to the base metal. Following the application of the polymer to the metal surface, as by spraying, dipping, or brushing, the coated surface is preferably air dried to at least partially remove solvent, then given an initial heat treatment at about 385° F. followed by baking at an elevated temperature, of the order of from 450 to 650° F., for a sufficient period of time, preferably on the order of 8 to 12 hours, the specific conditions being dependent upon the specific metal and polymer employed, to polymerize the polymer to obtain a solvent-resistant and corrosion-resistant coating uniformly enveloping the entire exposed surface of the metal. This heat treatment also chemically combines the receptive metal surface and the polymer, as evidenced by a discoloration at the interfacial layer between the metal and coating.

It is, therefore, an important object of the present invention to chemically react an organosiloxane polymer with an active metal for forming a coated article.

It is another important object of the present invention to provide a method for uniting films of organosiloxane polymers with an active metal selected from the group consisting of magnesium, cadmium, chromium, nickel, molybdenum, tungsten, aluminum, lead, tin and zinc, and alloys containing at least one of these metals.

It is a further important object of the present invention to protect active metal surfaces with an organosiloxane polymer by coating the surface with the organosiloxane polymer and then heating said coated surface to a temperature between 450° and 650° F.

Another object is to provide a fluid flow directing member for turbine engines and the like wherein that surface of the member exposed to the flow of working fluid is coated with a polymerized organosiloxane, whereby the aerodynamic characteristics of the member are improved.

It is a still further important object of the present invention to provide fluid flow directing members for superchargers, turbine engines, air compressors, and the like wherein the member is alloyed to a covering film of non-wettable, corrosion and temperature resistant organosiloxane polymer.

Other and further important objects of this invention will be apparent from the disclosures in the specification and the accompanying drawings.

On the drawings:

Figure 1 is a schematic representation of a turbo-jet engine having fluid directing members coated with an organosiloxane polymer in accordance with the practice of the present invention;

Figure 2 is a perspective view illustrating a representative compressor blade of the engine shown in Figure 1;

Figure 3 is a cross-sectional view taken along the plane III—III of Figure 2; and Figure 4 is a fragmentary cross-sectional view similar to Figure 3 illustrating a modification of the present invention.

As shown on the drawings:

In Figure 1, reference numeral 10 refers generally to a turbo-jet engine suitable for use in aircraft. As illustrated, the outline of the engine is defined by a general cylindrical casing 11 having an open, flared forward end 12 and a restricted, open rear end 13. As indicated by the directional arrows, the flow of air through the engine 10 proceeds from the flared, open forward end 12 to the restricted, open rear end 13.

The flared open forward end 12 defines the mouth of a diffuser chamber 14 having a nose 15 mounted therein to direct the flow of working fluid entering the diffusion chamber into a compression chamber 16. An axial-flow compressor 17 is mounted in the compression chamber 16 to receive the flow of fluid from the diffusion chamber 14. The compressor 17 comprises a rotor assembly 18 formed of alternate annular rings 18a and 18b press-fitted on a shaft 29 for rotation therewith. Rings 18a carry impeller blades 19 of desired air foil section mounted about the periphery thereof, while rings 18b serve as spacers to maintain the blade-carrying rings 18a in spaced relation. A plurality of stationary impeller blades 20 project inwardly toward the rotor 18 between the spaced rows of impeller blades 19 as shown in Figure 1 to define a stator cooperating with the rotor 18 to pump fluid from the diffusion chamber through the casing 11.

Fluid is passed from the axial flow compressor 17 rearwardly into a plurality of tubular combustion chambers 21 mounted symmetrically about the axis of the casing 11. The combustion chambers 21 are each provided with a flared, open forward end 22 and a restricted, open rear end 23. Baffles 24 extend from the compression chambers 21 centrally of the housing so that all of the working fluid pumped by the compressor 17 passes into the combustion chambers 21. Liquid fuel, such as a suitable hydrocarbon, is introduced into the combustion chamber 21 through nozzles in a pipeline represented schematically at 25 to form a combustible fuel-air mixture within the combustion chamber. The combustible fuel-air mixture within the combustion chamber is ignited, as by a torch igniter or a spark plug indicated generally at 26. The working fluid introduced into the combustion chamber 21 through the flared mouth 22 is thus mixed with fuel and ignited to raise the temperature of the working fluid to the desired value, following which the working fluid passes from the combustion chamber to the restricted rear end 23 of the combustion chamber.

An annular nozzle diaphragm 27, located directly in the path of the heated working fluid emitted from the combustion chamber 21, serves to direct heated gases against the blades of a turbine 28. The blades of the turbine 28 are thus directly impinged upon by the heated fluid from the combustion chamber, and the turbine serves to rotate the shaft 29 secured to the rotor 18 of the axial-flow compressor. The heated fluid, following the passage through the turbine 28, passes through a restricted annular passageway defined by the housing 11 and a tail cone 31. Following the passage through the restricted annular space 30, the heating gases pass through the restricted nozzle 13. If desired, additional fuel can be introduced through auxiliary fuel lines 32 mounted in the path of the gases from the combustion chamber following their passage through the turbine 28.

The compressor blade 19, illustrated in Figure 2, comprises a generally rectangular root portion 33 adapted to be secured to the rotor 18 and an air foil or vane portion 34 appropriately shaped to efficiently direct working fluid through the housing into the combustion chambers 21. The air foil section 34 has a concave face 34a and a convex face 34b designed to provide desired aerodynamic characteristics of the blade. In addition, the air foil or vane is twisted along its length, the faces 11a and 11b and the twist presenting a contour that is very difficult to manufacture, particularly with a highly polished exterior finish.

As illustrated in Figure 3, the air foil section 34, and that portion of the hub 33 which is exposed upon assembly of the blade within the compressor assembly 17, is coated with a layer of organosiloxane polymer 35. The entire rotor assembly 18 and also the stator blades 20, may be made of a heat resistant alloy such as a molybdenum, nickel, tungsten, or chrome steel. If the blade is to be employed in apparatus where the heat resistance characteristics of the blade are relatively unimportant, as in earlier compression stages of the compressor 17, the blade may be made of a relatively light alloy such as an alloy of aluminum or magnesium. Alloys containing cadmium, lead, tin or zinc may also be employed with such blade construction. Similar metals or alloys may be employed for constructing the housing 11, for lining the diffusor and compressor chambers of the engine 10, the nose 15 and the rotor hub 18 itself.

In manufacturing the engine as shown in Figure 1, the assembled engine is inspected by means of fluorescent or magnetic particles suspended in an oily liquid, such as kerosene or the like. Following this testing, the liquid and any lubricating oil and dirt on the engine is removed by cleaning with cleaning fluids, such as trichloroethylene. Such fluids are also employed in cleaning the engine during maintenance, operating tests, etc. The blades and any coatings thereon must be resistant to these cleaning fluids.

I have found that upon coating the surfaces of a metal selected from the group consisting of magnesium, cadmium, chromium, molybdenum, tungsten, nickel, aluminum, lead, tin or zinc, or alloys containing any one of these ingredients, with an organio-siloxane polymer, and heating the coated surface to a temperature of from approximately 450° to 650° F., the coating takes on the color of the oxide of the reactive metal present in the surface. For example, upon depositing a layer of an organosiloxane resin containing dimethyl siloxane, phenyl methyl siloxane, and monomethylsiloxane, and heating the coated surface to 500° F., the following colors were obtained with the indicated metallic surface:

| Metal Surface | Color Developed |
| --- | --- |
| Magnesium | Gray. |
| Chrome Steel | Olive Green. |
| Cadmium | Grayish Brown. |
| Lead | Yellowish Gray. |
| Tin | Gray. |
| Zinc | Whitish Gray. |
| Aluminum | White. |

It is to be noted that the colors in each instance correspond to the oxide of the metal surface being treated.

The color developed to form the plate evidently comes from the contact surface between the metal surface and the siloxane and does not extend completely through the coating. It is evident from observation and analysis that the coating as indicated in Figure 3 consists of a layer 36 of colored metal oxide having a clear layer 35 of polyorganosiloxane superimposed thereon.

The reason for the development of this color and the presence of the oxide are not completely understood at this time, but it is believed to be due to a chemical reaction occurring between the reactive metal and the organosiloxane polymer during the heat treatment of the coated article. In the organosiloxane coating resin employed above the following organosiloxane units were present:

Dimethylsiloxane $[(CH_3)_2SiO]x$;
Phenylmethylsiloxane $[(C_6H_5)(CH_3)SiO]x$; and
Monomethylsiloxane $[CH_3SiO_{1.5}]x$.

These ingredients of the coating resin are co-polymerized by forming a mixture of the corresponding organosiloxane halides or esters and co-hydrolyzing and co-condensing the mixture, in a suitable solvent, to obtain a high molecular weight, long-chain polymeric structure including, as structural elements, portions of each of these ingredients. In order that the copolymer may be employed as a coating composition, the co-condensation and polymerization of the polymer is stopped short of completion so that the resin may be employed for coating as dispersed in a hydrocarbon solvent, the resin containing a specific amount of residual hydroxyl groups due to the incomplete condensation of the resin. Such resins are commercially produced by Dow-Corning Corporation under the tradenames "DC 803" and "DC 804."

It is believed that these residual hydroxyl groups are present as polymeric units of the polymer structure and are capable of undergoing reaction with the reactive metal surface to which the polymer is applied. Assuming these hydroxyl groups to be present and to be capable of reaction, it is probable that the following reaction occurs:

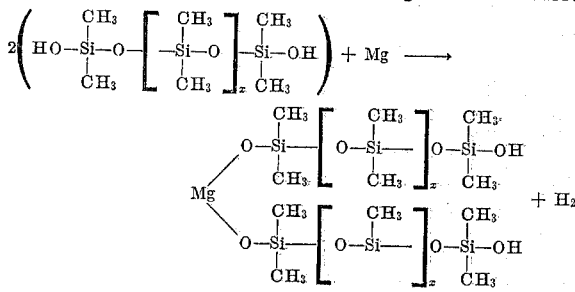

In the above reaction, the structure of the polymer has been simplified to illustrate the terminal hydroxyl groups present at the end of a dimethyl siloxane polymer while magnesium has been employed as a typical reactive metal of the group which has been found suitable for use in the present invention. It may be seen from the above reaction that the reactive metal serves as a linking unit to unite adjacent dimethyl siloxane units by acting as a bridge between a pair of oxygen atoms.

During the above reaction, condensation will be occurring throughout the entire organosiloxane polymer structure with the elimination of residual hydroxyl groups as water. This water will be free to react with magnesium, particularly at the temperatures involved, with the production of magnesium hydroxide.

During the continued heating of the coated article, magnesium hydroxide will be decomposed to magnesium oxide and water, the water being given off with the water evolved during the condensation of the resin as a whole, as follows:

$$Mg(OH)_2 \rightarrow MgO + H_2O$$

In the reaction above defined, the formation of the metallic oxide at those points where the siloxane is in contact with the reactive metal may be readily understood. Also, the extremely close adherence of the siloxane coating to the metal may be explained by the cross linkages which are obtained by the actual incorporation of the reactive metal into the polymerized siloxane structure.

I have found that the receptivity of certain metals may be affected by physical treatment of the surface. For example, the imparting of a smooth, usually desirable coating by the tumbling, polishing or buffing of the surface renders the surface less receptive to the siloxane resin, i. e., the bonding between the siloxane resin and the surface is less tenacious and the less adherent coating may be stripped from the coated surface. The reason for this lessening of the receptivity of some metals is not completely understood at this time, but it may be due to the formation of a more or less amorphous metallic surface by the tumbling or buffing of the crystalline surface structure. On the other hand, surfaces obtained by a conventional wet sand blast or pickling treatments have been found to be extremely receptive to the organosiloxane polymer. It is also possible to apply the coating directly to the oxidized surface of a receptive metal. For example, the application of a siloxane resin to a magnesium article having a surface layer of magnesium oxide results in the formation of a coating which adheres very tenaciously to the metallic surface.

The organosiloxane polymer is applied to the metal surface as dispersed in an organic solvent, preferably a hydrocarbon solvent such as toluene. The liquid polymer is preferably applied to the metal surface by spraying, although dipping may be employed if desired. The thickness of the coating is preferably less than 0.004 inch since a thicker coating will craze upon heating. The lower coating thickness limit is determined only by the smoothness of the base metal surface with relatively rough surfaces generally requiring a heavier siloxane coating to impart desired smoothness to the surface.

The solids content of the organosiloxane coating composition as applied should be from 30 to 60% by weight. If the solids content is lower than 30%, a porous coating is obtained upon baking due to the large amount of solvent which must escape from the coating composition. This porous coating lowers the resistance of the coating to cleaning solvents, such as trichloroethylene, and also lowers the corrosion resistance of the coated articles. If the solids content is greater than 60%, the coating of the base material is thick and uneven, resulting in the formation of an unsatisfactory coated article.

Following the coating of the base metal, the coated article is preferably air dried for a period of time sufficient to substantially remove the solvent from the coating. If desired, this air drying step may be carried out at an elevated temperature, although I prefer to air dry the coated article at room temperature for a period of approximately 3 hours. By this air drying step, the coated article is subjected to baking in a substantially solvent free condition, thus avoiding bubbling, blisters, etc.

After the air drying steps, the coated article is preferably subjected to a preliminary baking for a period of about 1 hour at a temperature of from 300° to 400° F., and preferably at a temperature of approximately 385° F. The preliminary baking effects a partial fusion of the polyorganosiloxane to give a more compact coating and prevents the damaging of the coating which may occur upon suddenly subjecting the coated article at room temperature to the relatively high baking temperature subsequently employed.

In order to obtain satisfactory coatings on receptive surfaces, such as the surfaces of compressor blades employed in turbine engines, the coating should be baked at a temperature above the highest temperature to be encountered in operation of the compressor.

It has been found that at a compression ratio of 5 to 1 the highest temperature to which any of the blades in the compressor will be subjected is approximately 490° F. plus the temperature of the incoming air. I have found, however, that curing at a temperature of about 500° F. is generally sufficient, since following curing at this temperature the coating will not become tacky, even upon severe heating at greatly elevated temperatures. The minimum temperature at which the improved coating of the present invention may be obtained is approximately 450° F., and the baking temperature should be maintained for a period of from 6 to 12 hours for optimum results.

It should be understood that the explanation hereinbefore given regarding the coating of the compressor blade 34 may also be applied to the other fluid directing members of the diffusion chamber 14 and the compression chamber 16 of the engine 10. For example, the interior surfaces of the housing 11 in both the diffusion and the compression chamber may be desirably coated with a siloxane polymer. Similarly, the nose 15, the hub 18 of the compressor, and the stator blades 20 may also be coated with organosiloxane and baked as hereinbefore explained.

I have found that coatings of organosiloxane applied to certain metals, for example, ferrous foundation metals, appear to be satisfactory and function as above-described at lower temperatures, but fail when subjected to severe temperature conditions. The coating flakes from the base material when heated at high temperatures, apparently due to the non-adherence of the oxide to the base metal. This flaking may be prevented and temperature resistance of the coatings may be improved by coating the base metal surfaces with a second metal capable of forming a temperature resistant coating with the organosiloxane polymer. The metal layer may suitably be cadmium, applied by electrodeposition; aluminum, applied by a conventional hot dip process; or other desirable metals.

As shown in Figure 4, the blade 34, formed for example of a high iron content alloy, may preferably be electroplated with a layer 37 of a metal, such as cadmium, capable of forming a temperature resistant coating with the organosiloxane polymer 35. The cadmium oxide layer 36 thus serves to bond the organosiloxane polymer to the base metal 34.

The temperature resistance of the organosiloxane polymer may be increased by compounding or pigmenting the resin with a powdered metal, as for instance with aluminum powder. Organosiloxane resins containing 10% aluminum pigments by weight of total solids or 2½% by weight of the original liquid coating resin are capable of withstanding temperatures up to and including 700° F. Accordingly, it may be desirable to coat the interior surfaces of the housing 11 adjacent the combustion tube 21 or even to coat the compressor blades of the rearmost stages of the compressor with such pigmented resins.

I have found that the advantages residing in the coating of an air directing member with an organosiloxane by the method of the present invention are threefold. First, such a member coated with an organosiloxane as herein defined possesses an improved, smooth finish; secondly, the member is protected from corrosion such as occurs upon the exposure of metal surfaces to salt-laden air and under similar deleterious conditions; and thirdly, the film is not wet by water, oil or air.

The improved finish imparted to the blade by the coating method of the present invention is not only desirable due to the resultant elimination of hand-polishing but also makes possible the initial formation of the blade to a good air foil section without particular regard to the smoothness of the surface obtained. The coating as herein provided is extremely thin, on the order of 0.001 inch in thickness, smooth, and follows the contour of the surface to which it is applied.

The importance of the corrosion protection afforded the blade in prolonging blade life would be evident to those skilled in the art. Corrosion in a turbine engine may occur upon operation of the engine in salt-laden or moisture-laden air. During the operation of the turbine, lubricating oil is sprayed upon the fluid directing components of the engine and exerts a corrosive effect upon these members. The coated fluid flow directing members of the present invention are extremely resistant to each of the above-defined types of corrosion.

The third advantage gained by the employment of the coated air flow directing member of the present invention is that due to the non-wettability of the surface by water, oil and air, a surprising increase in the efficiency of the turbine is obtained. The coated members, being non-wettable by water, are naturally more resistant to icing than the metal surfaced members heretofore employed. Also, since the blades are not wet by oil, the building up of decomposition products of the lubricating oils employed in the turbine upon the dead air surfaces at the rear of the blade is greatly reduced. This build-up of the oil decomposition products results in the destruction of the air foil sections of the blade and a consequent decrease in the performance and efficiency of the blades. It has been found by operation under actual operating conditions that blades coated as herein described are amazingly clean when compared with uncoated metal blades.

It has been found that the injection of water at the compressor inlet, as at 12 in Figure 1, results in the cooling of the incoming air and an increase in the pressure across the nozzle 13 and an increase in the mass of fluid handled by the engine. It has been found that a 24% increase in thrust may be realized by water injection into a turbo-jet engine. However, the use of water injection has not become general, since the continued use of hard water leaves a deposit on the walls of the air passages and fluid directing members, causing a decrease in the performance of the turbine and a consequent loss of the thrust increase originally obtained by water injection. The extreme corrosion resistance and the non-wettability with water of the organosiloxane coated fluid directing members of the present invention now makes feasible the employment of water injection with the consequent increase in thrust which may be thus realized.

The non-wettability of the coated fluid directing surfaces by air reduces the bubbling caused upon the rapid movement of the working fluid flowing through the engine in contact with these surfaces. Bubbling causes an undesired turbulence in the fluid which decreases greatly the efficiency of the axial flow compressor 17 and of the engine 10 as a whole. I have found that the coated blades or other air directing members of the present invention are much more efficient and create much less fluid turbulence than the metal blades having a corresponding surface smoothness. The reduction of turbulence obtained by the use of the member of the present invention must be due to the non-wettable character of the coating in conjunction with the smoothness of the finished member. Although use of the term "non-wettable" with reference to an elastic working fluid, such as air, is unusual it should be appreciated that reduction of air "bubbling" or turbulence together with a reduction of the frictional resistance to the passage of the blade through the air by an amount which is in excess of the reduction in friction obtained by the employment of a smoother surface must mean that the organosiloxane polymer surface does not retain an appreciable air film thereon and is thus "not-wettable" by the air.

As a specific example of the method of the present invention, particularly applied to the coating of a compressor blade, such as that illustrated in the drawings, the following data is presented:

A turbine blade of a magnesium alloy was spray coated with an organosiloxane coating resin, more specifically, a toluene solution of a copolymer containing dimethyl siloxane, phenylmethylsiloxane and monomethylsiloxane structural units. The resin coating thus applied was 0.001 inch in thickness and the coating was subjected to an initial air drying for 3 hours at room temperature to remove solvent and a preliminary baking at 385° F. The coated surface was then baked at a temperature of 500° F. for twelve hours. The blade was found, under actual operating conditions, to possess extremely desirable erosion, corrosion resistant properties when subjected to salt-laden air, lubricating oils and dirt, and to be resistant to cleaning fluids, such as trichloroethylene, used in engine maintenance.

Prior to the application of the siloxane coating, the smoothness of the metal surface was from 30 to 50 root mean square micro-inches. The surface, when microscopically inspected, was found to be composed of relatively sharp, steep undulations. Following the application of the siloxane coating and the baking of the coating on the surface, the finish has a smoothness of from 5 to 7 root mean square micro-inches and the undulations were smooth and gentle. The advantages of obtaining a smooth, gently undulating surface, as above described, will be evident from the effect upon the possibility of corrosion by dirt particles or by salt and other chemicals in the air becoming lodged upon the surface. Further, the smoother surface presented by the coated article will necessarily result in the lessening of the possibility of adherence of ice to the surface.

Blades made of cadmium, high chromium steel, nickel steel, tungsten steel, molybdenum steel, aluminum, lead, tin, zinc, and cadmium plated iron were also coated as above described. Each of these blades developed its respective metal oxide color as indicated in the table in column 4, and the erosion and corrosion resistance, adherence, surface smoothness, and trichloroethylene resistance of these blades were comparable to the results obtained with the magnesium blade as indicated above.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. The method of coating metal surfaces which comprises applying to a surface of a reactive metal capable of forming an adherent metal oxide a layer of a solution of an incompletely condensed organosiloxane polymer containing residual hydroxyl groups in a hydrocarbon solvent, the solution layer containing from 30 to 60% solids by weight, substantially removing said solvent at room temperature and heating the coated surface to a temperature of from 450 to 650° F. for a period of time sufficient to condense the polymer, thereby reacting the metal surface with the polymer to form an adherent metal oxide layer bonded to the polymer by metal-oxygen bonds.

2. The method of preparing corrosion and erosion resistant metal impeller blades which comprises applying a layer of an incompletely condensed organosiloxane coating resin containing residual hydroxyl groups and having a solids content of from 30 to 60% to airfoil surface of a blade made of a reactive metal capable of forming metal-oxygen linkages with an organosiloxane, air drying said resin, baking said resin at a temperature of from 300 to 400° F., and heating said surface to a temperature of from 450 to 650° F. for a period of time sufficient to condense said resin, while simultaneously reacting said resin with said reactive metal surface to obtain a coating consisting essentially of an adherent film of metal oxide on the blade surface and a condensed organosiloxane film firmly bound to said metal oxide film by metal-oxygen linkages within said polymer.

3. A metal base fluid directing member adapted for use in turbine engines comprising a base portion for attachment to a supporting member and a fluid directing surface composed of an adherent oxide of the base metal and a condensed organosiloxance film firmly bonded to said base metal oxide surface by metal-oxygen linkages within the polymer, said film having a thickness of not more than .004 inch.

4. A coated metal article comprising a body composed of a metal capable of reacting with an organosiloxane, a film of organosiloxane polymer on said body, and an interfacial layer between the film and the body composed of a reaction product of the metal and polymer including metal-oxygen linkages within the polymer and an oxide of the reactive metal.

5. A fluid directing member adapted for use in turbine engines comprising a base portion adapted for attachment to a supporting member and airfoil surfaces extending beyond said base portion for exposure to the flow of working fluid through the engine, said surfaces being formed of a metal capable of reaction with an organosiloxane and coated with successive, superimposed, enveloping layers of the oxide of said metal and an organosiloxane resin bound to said oxide layer by metal-oxygen bond, said layers enhancing the corrosion and erosion resistance of said surfaces and improving the aerodynamic efficiency of said surfaces.

6. An impeller blade for a compressor comprising a base portion for attachment to a support member and an airfoil section extending beyond said base portion, said blade having a metallic airfoil surface enveloped within a layer of an organosiloxane polymer firmly bonded to the surface by a chemical reaction with the metal surface and a metal oxide layer interposed therebetween, said polymer layer being less than 0.004 inch thick and the coated airfoil surface being non-wettable by water and air, being corrosion and erosion resistant, and possessing improved aerodynamic properties.

7. The method of coating surfaces of reactive metals capable of forming adherent metal oxides which comprises applying to the surface a layer of an organosiloxane polymer dispersed in a hydrocarbon solvent, said layer containing from 30 to 60% by weight solids, drying said coated surface at room temperature to remove substantially all of said solvent, pre-baking said surface at a temperature of about 300 to 400° F., baking the coated surface at a temperature of from 450 to 650° F. for from six to twelve hours, reacting said polymer and said metal surface during said baking step to form metal-oxygen linkages between said surface and said polymer, and controlling the thickness of the applied layer to produce a baked siloxane surface coating of not more than about 0.004 inch thick.

8. The method of coating reactive metal surfaces which comprises applying a layer of an organosiloxane polymer solution having a solids content of from 30 to 60% to the surface of a metal capable of forming an adherent metal oxide, and heating the coated surface to a temperature of from 450 to 650° F., thereby forming the metal oxide and reacting said metal with said polymer.

9. The method of coating metal surfaces which comprises depositing a layer of a metal capable of forming an adherent metal oxide on the surface of a metal not capable of forming an adherent metal oxide, applying a layer of an organosiloxane polymer solution having a solids content of from 30 to 60% by weight and a thickness of not more than 0.004 inch to the surface of said deposited layer, and heating the coated surface to a temperature of from 450 to 650° F., thereby forming the adherent metal oxide on said deposited layer and reacting the metal of the deposited layer with said polymer.

10. A coated metal article comprising a body composed of a first metal incapable of forming an adherent metal oxide on its surface, a layer of a second metal capable of forming an adherent metal oxide on its surface, said second metal being deposited on the surface of said first metal, a film of an organosiloxane polymer on said second metal surface, a film of a metal oxide of said second metal interposed between said organosiloxane polymer film and said second metal layer, and an interfacial layer between said film and said second metal oxide composed of a reaction product of the metal and of the polymer including metal-oxygen linkages within the polymer.

References Cited in the file of this patent

UNITED STATES PATENTS

| | | |
|---|---|---|
| 776,518 | Junggren | Dec. 6, 1904 |
| 2,405,988 | Barry | Aug. 20, 1946 |
| 2,432,891 | Hervey | Dec. 16, 1947 |
| 2,447,611 | Collings et al. | Aug. 24, 1948 |
| 2,470,593 | Webb et al. | May 17, 1949 |